(12) United States Patent
Oonishi et al.

(10) Patent No.: US 12,026,006 B2
(45) Date of Patent: Jul. 2, 2024

(54) POI POPULARITY DERIVATION DEVICE

(71) Applicant: NTT DOCOMO, INC., Chiyoda-ku (JP)

(72) Inventors: Anna Oonishi, Chiyoda-ku (JP); Satoshi Kawasaki, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/996,044

(22) PCT Filed: May 6, 2021

(86) PCT No.: PCT/JP2021/017381
§ 371 (c)(1),
(2) Date: Oct. 12, 2022

(87) PCT Pub. No.: WO2021/241154
PCT Pub. Date: Dec. 2, 2021

(65) Prior Publication Data
US 2023/0229721 A1 Jul. 20, 2023

(30) Foreign Application Priority Data

May 26, 2020 (JP) ................................ 2020-091196

(51) Int. Cl.
*G06F 16/95* (2019.01)
*G06F 16/35* (2019.01)
(Continued)

(52) U.S. Cl.
CPC ........ *G06F 16/9536* (2019.01); *G06F 16/355* (2019.01); *G06F 16/374* (2019.01); *G06Q 50/01* (2013.01)

(58) Field of Classification Search
CPC .. G06F 16/9536; G06F 16/355; G06F 16/374; G06Q 50/01
See application file for complete search history.

(56) References Cited

U.S. PATENT DOCUMENTS 9,811,564 B2 * 11/2017 Ishiguro ................. G06Q 50/01
2014/0006408 A1 * 1/2014 Rae ....................... G06F 40/295
707/E17.089

(Continued)

FOREIGN PATENT DOCUMENTS

JP 2014-235597 A * 12/2014
WO WO 2018/186235 A1 10/2018

OTHER PUBLICATIONS

English translation of International Preliminary Report on Patentability and Written Opinion issued Dec. 8, 2022 in PCT/JP2021/017381, 6 pages.

(Continued)

*Primary Examiner* — Merilyn P Nguyen
(74) *Attorney, Agent, or Firm* — Oblon, McClelland, Maier & Neustadt, L.L.P.

(57) ABSTRACT

A POI popularity derivation device (10) includes: a dictionary generation unit (11) that assigns a feature word used as a co-occurrence word of a POI name to each popularity-assigned POI name serving as a popularity assignment target to generate a popularity-assigned POI dictionary in which a popularity-assigned POI name and a feature word are associated with each other; an extraction unit (12) that extracts posted data serving as a search target from posted data on the basis of predetermined criteria; and a popularity derivation unit (18) that searches for the posted data on the basis of a predetermined rule regarding feature words while referring to the popularity-assigned POI dictionary, to extract posted data linked to the popularity-assigned POI name, and derives the popularity of each popularity-assigned POI name on the basis of the number of pieces of extracted posted data for each popularity-assigned POI name.

10 Claims, 7 Drawing Sheets

(51) Int. Cl.
*G06F 16/36*     (2019.01)
*G06F 16/9536*   (2019.01)
*G06Q 50/00*     (2012.01)

(56)                References Cited

U.S. PATENT DOCUMENTS

2014/0059060 A1*  2/2014  Yang ................. G06F 16/29
                                               707/754
2016/0063058 A1*  3/2016  Spehr ............... G06F 16/248
                                               707/770
2017/0067748 A1*  3/2017  Glover ............. G01C 21/3679
2019/0259073 A1*  8/2019  Enokizono ........ G06Q 30/0282
2020/0141757 A1*  5/2020  Deguchi ........... G01C 21/3811
2023/0066144 A1*  3/2023  Yoshikawa ...... G08G 1/096775

OTHER PUBLICATIONS

International Search Report issued Jun. 8, 2021 in PCT/JP2021/017381 filed on May 6, 2021, 2 pages.
Japanese Office Action issued Jan. 30, 2024 in Japanese Patent Application No. 2022-527625 (with unedited computer-generated English translation), 9 pages.
Japanese Office Action issued Oct. 24, 2023 in Japanese Application 2022-527625, (with unedited computer-generated English translation), 8 pages.

\* cited by examiner

Fig.6

LINKING LIST 13A

| POI NAME | CO-OCCURRENCE ASSOCIATION | CATEGORY | PREFECTURE | LINKED TWEETS (TWEETS INCLUDING UNDERLINED PART ARE COUNTED TWEETS) |
|---|---|---|---|---|
| TOSHIMAEN | (1) | AMUSEMENT PARK | TOKYO | TOSHIMAEN IS FUN<br>I WENT TO TOSHIMAEN AND, AFTER ALL, THE <u>AMUSEMENT PARK</u> IS NICE |
| KIYOMIZU-DERA | (2) | BUDDHIST TEMPLE | KYOTO | I WENT TO KIYOMIZU-DERA<br>I WENT TO KIYOMIZU-DERA IN NAGANO<br>I WENT TO KIYOMIZU-DERA BY BUS FROM GION-SHIJO STATION ON KEIHAN ELECTRIC RAILWAY. I AM ENJOYING MY TRIP TO <u>KYOTO</u> |
| KIYOMIZU-DERA | (2) | BUDDHIST TEMPLE | CHIBA | I WENT TO KIYOMIZU-DERA<br>I WENT TO KIYOMIZU-DERA IN KYOTO<br>I WENT TO KIYOMIZU-DERA IN <u>ISUMI CITY, CHIBA</u> PREFECTURE |
| TOKYO DISNEYLAND | (3) | AMUSEMENT PARK | CHIBA | I WENT TO TOKYO DISNEYLAND |
| KICHIJOJI | (4) | BUDDHIST TEMPLE | TOKYO | KICHIJOJI IN TOKYO<br>THERE IS <u>BUDDHIST TEMPLE</u> CALLED KICHIJOJI |

POI POPULARITY DERIVATION DEVICE

TECHNICAL FIELD

The present disclosure relates to a point of interest (POI) popularity derivation device that derives popularity of a POI from posted data of a social networking service (SNS) (for example, tweets posted on Twitter (registered trademark)).

BACKGROUND ART

Conventionally, a technology for deriving popularity of various POIs from posted data of an SNS (for example, a tweet posted on Twitter) has been proposed (see Patent Literature 1). In general, a technology for deriving popularity of a POI on the basis of the number of times a POI name appears in posted data is known.

CITATION LIST

Patent Literature

[Patent Literature 1] International Publication WO2018/186235

SUMMARY OF INVENTION

Technical Problem

In a technology for deriving popularity of a POI on the basis of, for example, the number of times the name of the POI appears in posted data described above, when keyword matching between the POI name and a description of the posted data is simply performed, a POI mentioned by a poster is unclear in a case in which the POI name is homonymous with other names (personal names), and a POI mentioned by the poster is unclear in a case in which there is the same POI name for a plurality of POIs with different locations (for example, Kiyomizu-dera in Kyoto prefecture, Kiyomizu-dera in Nagano Prefecture, and the like). In order to maintain the accuracy of popularity derivation while taking such cases into account, it was necessary for a human to visually check posted data and individually determine whether or not the number of times a POI name appears in posted data should be counted.

However, no literature, including Patent Literature 1, proposes any improvement on the above points.

An object of the present disclosure is to derive the popularity of a POI with high accuracy while reducing manual intervention in order to solve the above problem.

Solution to Problem

A POI popularity derivation device according to the present disclosure includes a dictionary generation unit configured to assign a feature word used as a co-occurrence word of a POI name to each popularity-assigned POI name serving as a popularity assignment target to generate a popularity-assigned POI dictionary in which a popularity-assigned POI name and a feature word are associated with each other; an extraction unit configured to extract posted data serving as a search target from posted data on the basis of predetermined criteria; and a popularity derivation unit configured to search for the posted data extracted by the extraction unit on the basis of a predetermined rule regarding feature words while referring to the popularity-assigned POI dictionary generated by the dictionary generation unit, to extract posted data linked to the popularity-assigned POI name, and derive the popularity of each popularity-assigned POI name on the basis of the number of pieces of extracted posted data for each popularity-assigned POI name.

In the above POI popularity derivation device, the dictionary generation unit assigns the feature word used as the co-occurrence word of the POI name to each popularity-assigned POI name serving as a popularity assignment target to generate the popularity-assigned POI dictionary in which the popularity-assigned POI name and the feature word are associated with each other. The extraction unit extracts the posted data serving as a search target from the posted data on the basis of the predetermined criteria. The popularity derivation unit searches for the posted data extracted by the extraction unit on the basis of the predetermined rule regarding feature words while referring to the popularity-assigned POI dictionary generated by the dictionary generation unit, to extract the posted data linked to the popularity-assigned POI name, and derives the popularity of each popularity-assigned POI name on the basis of the number of pieces of extracted posted data for each popularity-assigned POI name. Accordingly, the posted data is searched for on the basis of the predetermined rule regarding the feature words while referring to the popularity-assigned POI dictionary in which the popularity-assigned POI name and the feature word (the feature word used as co-occurrence word of the POI name) are associated with each other, and the posted data linked to the popularity-assigned POI name is extracted. Further, because the popularity of each popularity-assigned POI name is derived on the basis of the number of pieces of extracted posted data for each popularity-assigned POI, it is possible to derive the popularity of the POI with high accuracy while reducing manual intervention.

Advantageous Effects of Invention

According to the present disclosure, it is possible to derive the popularity of the POI with high accuracy while reducing manual intervention.

BRIEF DESCRIPTION OF DRAWINGS

FIG. 6 is a diagram illustrating an example of a linking list.

DESCRIPTION OF EMBODIMENTS

Figure 1:
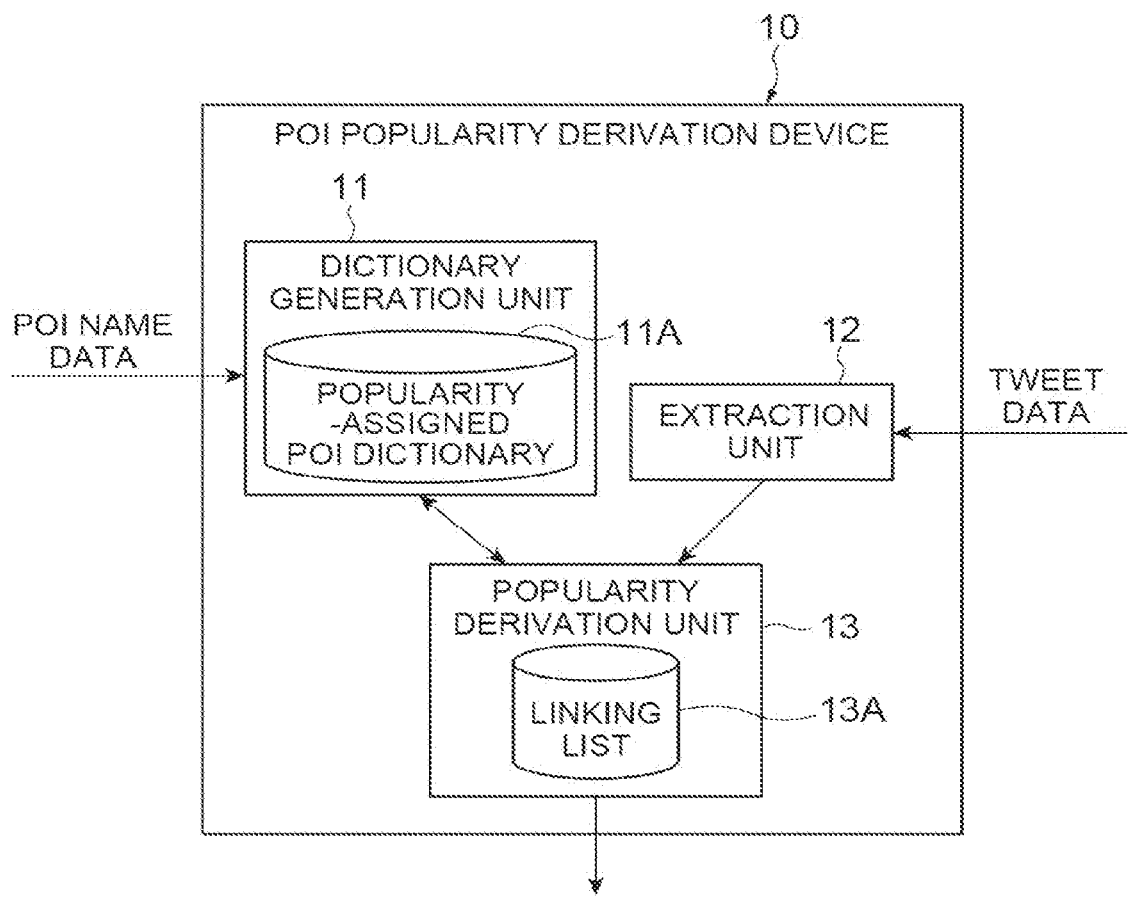
FIG. 1 is a functional block diagram illustrating a configuration of a POI popularity derivation device.

Hereinafter, an embodiment of a POI popularity derivation device will be described with reference to the drawings. As illustrated in FIG. 1, a POI popularity derivation device 10 according to the present embodiment includes a dictionary generation unit 11, an extraction unit 12, and a popularity derivation unit 13. Hereinafter, a function, operation, and the like of each unit will be described.

The dictionary generation unit 11 is a functional unit that selects popularity-assigned POI names that are popularity assignment targets, and assigns a feature word used as a co-occurrence word of a POI name to each of the selected popularity-assigned POI names, to generate a popularity-assigned POI dictionary 11A in which the popularity-assigned POI name and the feature word are associated with each other. An example of a method of selecting a popularity-assigned POI name and a method of generating the popularity-assigned POI dictionary 11A will be described below.

The extraction unit 12 is a functional unit that extracts posted data that is a search target from the posted data on the basis of a predetermined criterion, and extracts the posted data on the basis of a predetermined criterion such as extraction of only posted data in Japanese and extraction of only original posted data, as opposed to copies of posted data of others, and sends the posted data to the popularity derivation unit 13.

The popularity derivation unit 13 is a functional unit that searches for the posted data extracted by the extraction unit 12 on the basis of a predetermined rule regarding feature words while referring to the popularity-assigned POI dictionary 11A generated by the dictionary generation unit 11, to extract posted data linked to the popularity-assigned POI name, and derives the popularity of each popularity-assigned POI name on the basis of the number of pieces of extracted posted data for each popularity-assigned POI name. For example, a linking list 13A including the popularity-assigned POI name and the linked posted data is formed, and the popularity of each popularity-assigned POI name is derived on the basis of the number of pieces of posted data for each popularity-assigned POI name in the linking list 13A. In reality, because there are a plurality of patterns, such as the same POI names (for example, Kiyomizu-dera) with the same popularity-assigned POI name for different POIs, the number of pieces of posted data for each popularity-assigned POI name in the linking list 13A is not simply derived as the popularity for each popularity-assigned POI name. Details of a method of deriving popularity in this case will be described below.

Hereinafter, processing that is executed in the POI popularity derivation device 10 will be described with reference to FIGS. 2 to 6. Hereinafter, an example in which tweets posted on Twitter are used will be described as an example of the "posted data."

Figure 2:
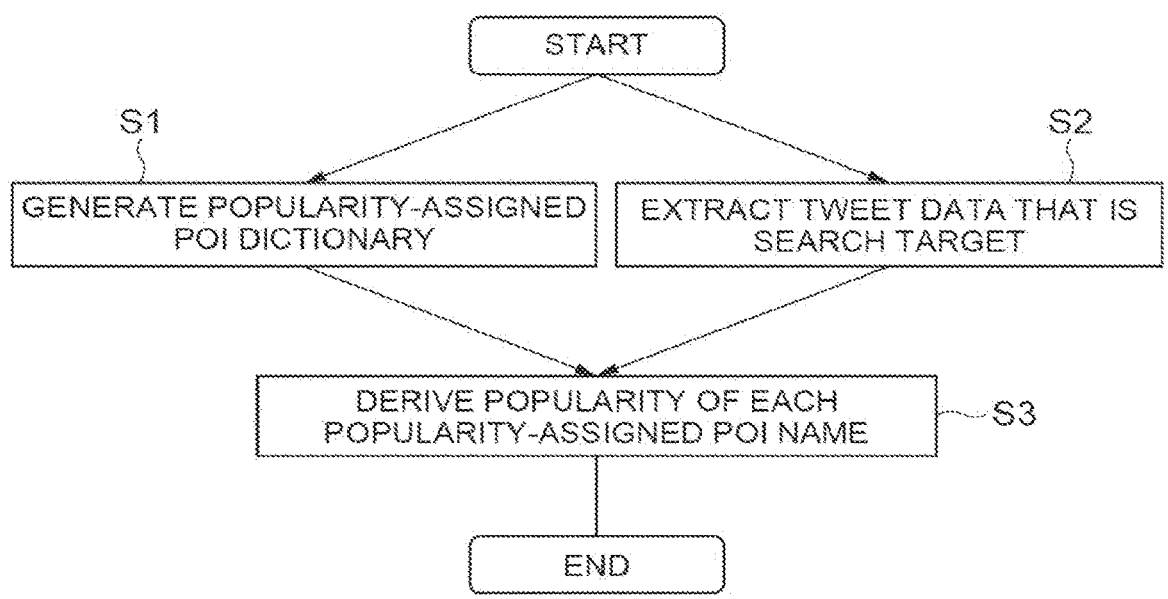
FIG. 2 is a flowchart illustrating an overview of processing that is executed in the POI popularity derivation device.
Figure 3:
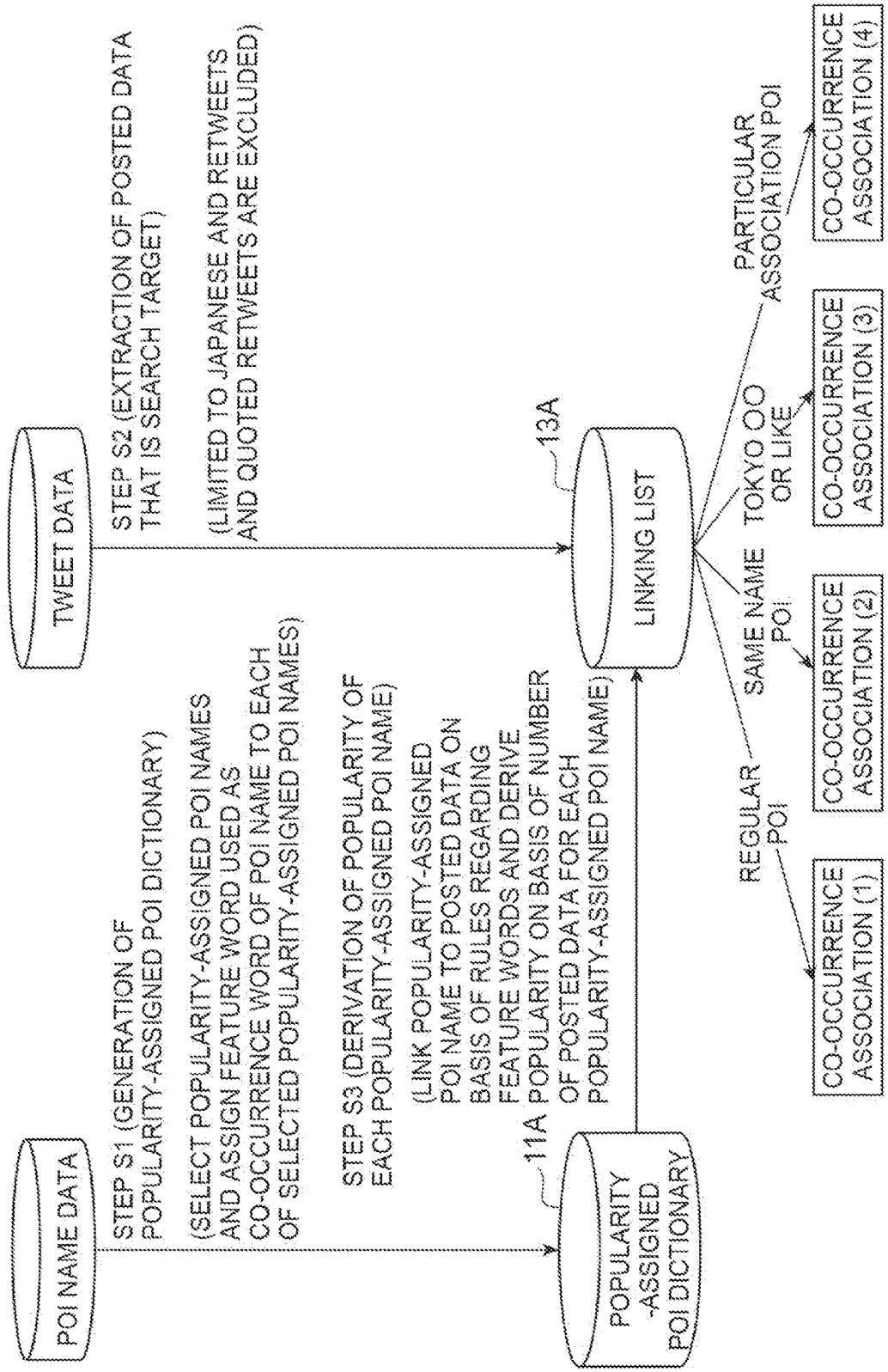
FIG. 3 is a diagram illustrating the processing of FIG. 2.
Figure 4:
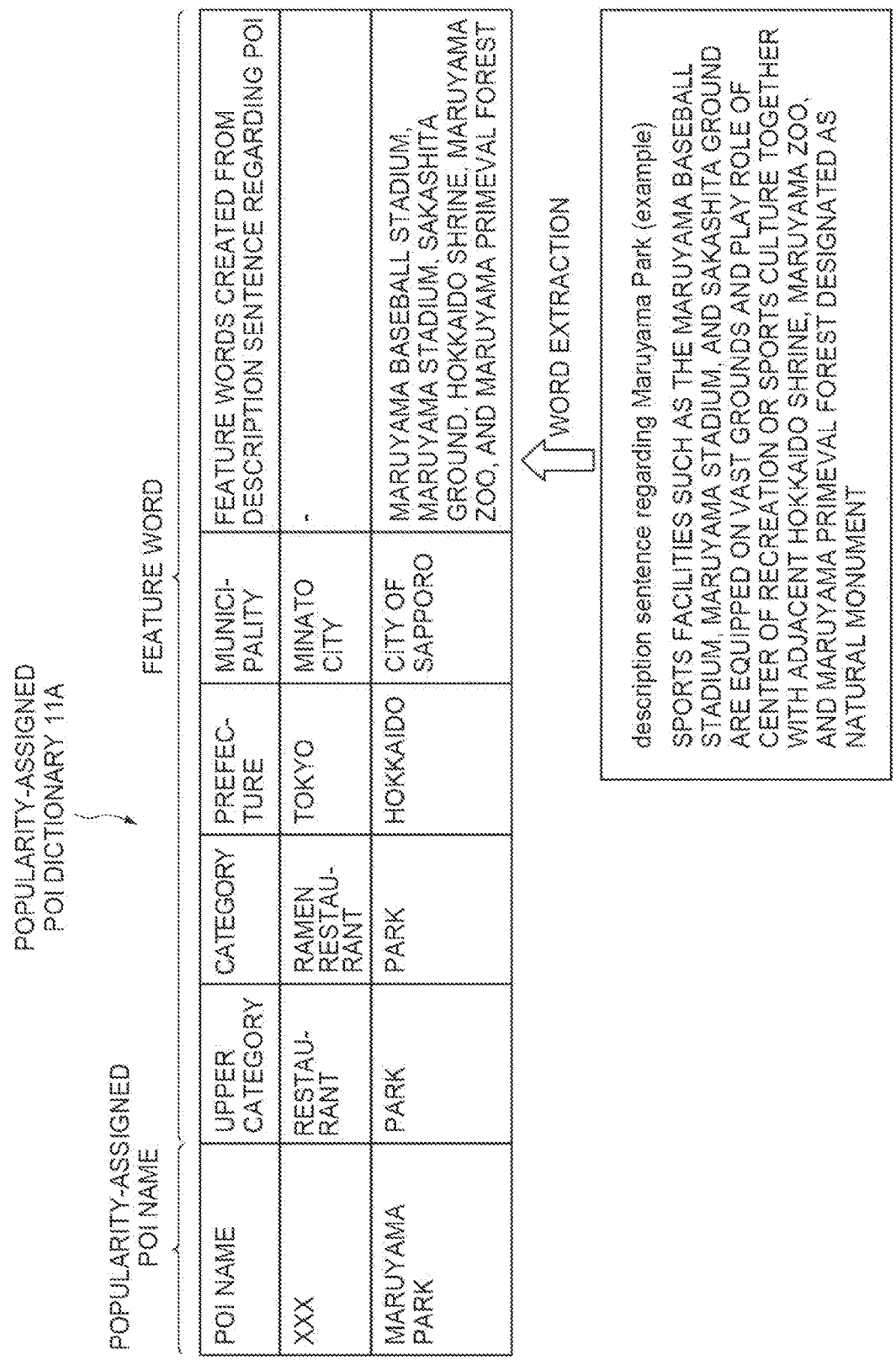
FIG. 4 is a diagram illustrating an example of a popularity-assigned POI dictionary.

As illustrated in FIGS. 2 and 3, the dictionary generation unit 11 selects a popularity-assigned POI name that is a popularity assignment target, and assigns a feature word used as a co-occurrence word of a POI name to each of the selected popularity-assigned POI names, to generate the popularity-assigned POI dictionary 11A in which the popularity-assigned POI name and the feature word are associated with each other (step S1). Here, for example, the dictionary generation unit 11 selects, as a popularity-assigned POI name, a POI name determined to be a proper noun by using a morpheme analysis dictionary (for example, mecab-ipadic-NEologd), a unique name, which is a POI name of a specific category that is favorable for deriving popularity (for example, an amusement park, a meeting place, or the like), or the like. Further, the dictionary generation unit 11 assigns the feature word used as a co-occurrence word of the popularity-assigned POI name to each of the selected popularity-assigned POI names. As illustrated in FIG. 4, examples of the feature words used as co-occurrence words of the popularity-assigned POI name may include "category," "upper category" which is an upper concept of the category, "prefecture" in which a POI is located, "municipality" in which a POI is located, and "feature words created from a description sentence regarding POI." For example, "ramen restaurant" as the category, "restaurant" as the upper category, "Tokyo" as the prefecture, and "Minato city" as the municipality are assigned to the POI name "XXX" of a ramen restaurant in Minato city, Tokyo. Feature words such as "park" as the category and the upper category, "Hokkaido" as the prefecture, and "City of Sapporo" as the municipality are assigned to "Maruyama Park" in City of Sapporo, Hokkaido, and words (POI names) "Maruyama Baseball Stadium, Maruyama Stadium, Sakashita Ground, Hokkaido Shrine, Maruyama Zoo, and Maruyama Primeval Forest" related to Maruyama Park are extracted from a description sentence regarding Maruyama Park shown in a lower part of FIG. 4, and are assigned as feature words.

On the other hand, the extraction unit 12 extracts tweet data that is a search target from tweet data posted on Twitter on the basis of a predetermined criterion (step S2). Here, for example, the extraction unit 12 extracts tweet data on the basis of predetermined criteria such as extracting only Japanese tweets, and extracting only original tweets excluding retweets and quoted retweets of others, and sends the tweet data to the popularity derivation unit 13.

The popularity derivation unit 13 searches for the extracted posted data on the basis of the predetermined rule regarding feature words while referring to the popularity-assigned POI dictionary 11A to extract posted data linked to the popularity-assigned POI name, and derives the popularity of each popularity-assigned POI name on the basis of the number of pieces of extracted posted data for each popularity-assigned POI name (step S3). In this case, the popularity derivation unit 13 forms a linking list 13A including the popularity-assigned POI name and linked posted data.

FIG. 6 illustrates an example of a linking list 13A. The linking list 13A illustrated in FIG. 6 includes the popularity-assigned POI name, the associated feature word ("category" and "prefecture" are illustrated in FIG. 6), linked tweets, and a co-occurrence word association type recognized at the time of linking. The co-occurrence word association type is a type indicating which of a plurality of patterns of co-occurrence word association processing, which will be described below, should be performed from a relationship between the POI name, the feature word, and linked tweets, and here, a total of four types (1) to (4) are exemplified. Hereinafter, the plurality of patterns of co-occurrence word association processing will be described with reference to FIGS. 5 and 6.

Figure 5:
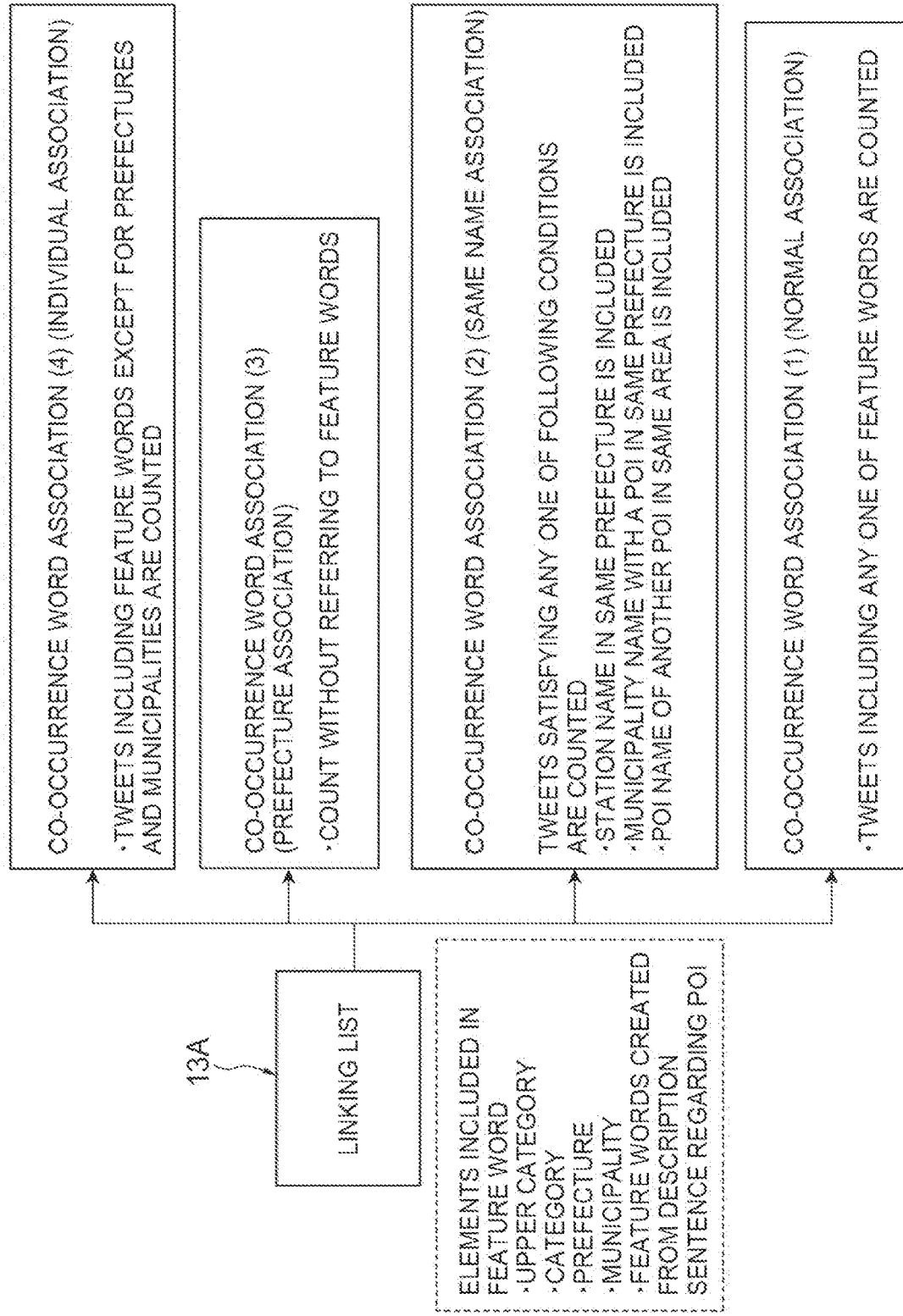
FIG. 5 is a diagram illustrating various co-occurrence word associations.

Co-occurrence word association (4) shown at the top of FIG. 5 is individual association regarding, for example, names that are commonly used in POI names and non-POI names (especially place names), and names that are not only place names in Tokyo but also POI names of temples in Tokyo are targets, like "Kichijoji" illustrated in FIG. 6. In this co-occurrence word association (4), tweets including feature words except for prefectures and municipalities are counted. Therefore, "Kichijoji in Tokyo" among examples of tweets linked to "Kichijoji" illustrated in FIG. 6 is not counted because "Kichijoji in Tokyo" includes "Tokyo" that is a prefecture name, but "there is a Buddhist temple called Kichijoji" is counted because "there is a Buddhist temple called Kichijoji" includes a feature word "Buddhist temple" other than a prefecture or municipality among feature words. The co-occurrence word association (4) as described above is not limited to the example of "Kichijoji," and is executed, for example, for a name of a roadside station (a road facility in which a commercial facility, a rest facility, a regional promotion facility, and the like are incorporated).

Next, co-occurrence word association (3) is association regarding, for example, unique POI names including a prefecture name, such as Tokyo Disneyland and Osaka Castle, and linked tweets are counted without referring to feature words. Therefore, an example of the tweet "I went to Tokyo Disneyland" linked to "Tokyo Disneyland" illustrated in FIG. 6 does not include the feature word, but is counted according to the rule that the feature word is not referred to.

Next, co-occurrence word association (2) is association regarding the same POI name in which there are the same popularity-assigned POI names for different POIs, and tweets satisfying at least one of:

A condition that a station name in the same prefecture is included

A condition that a municipality name with a POI in the same prefecture is included A condition that a POI name of another POI in the same area is included are counted. Therefore, among examples of tweets linked to "Kiyomizu-dera" in Kyoto prefecture, among the POI names "Kiyomizu-dera" illustrated in FIG. 6, "I went to Kiyomizu-dera" and "I went to Kiyomizu-dera in Nagano" are not counted because these do not include a feature word regarding "Kiyomizu-dera" in Kyoto prefecture, whereas "I went to Kiyomizu-dera by bus from Gion-Shijo Station on the Keihan Electric Railway. I am enjoying my trip to Kyoto" is counted because this satisfies the condition that "Kyoto" regarding the feature word "Kyoto prefecture" is included and "Gion-Shijo Station" which is the name of a station in the same prefecture (Kyoto prefecture) is included. On the other hand, "I went to Kiyomizu-dera" and "I went to Kiyomizu-dera in Kyoto" among examples of tweets linked to "Kiyomizu-dera" in Chiba prefecture are not counted because these do not include feature words regarding "Kiyomizu-dera" in Chiba prefecture, and "I went to Kiyomizu-dera in Isumi, Chiba prefecture" is counted because this satisfies a condition that the feature word "Chiba prefecture" is included and the name of a municipality (Isumi) with a POI in the same prefecture is included. These three conditions are typical examples, and conditions other than these may be included.

Further, the co-occurrence word association (1) is a normal association regarding POI names that are not targets of the co-occurrence word associations (4) to (2) described above, and tweets including any one of feature words regarding a POI name are counted. Therefore, among the tweets linked to a POI name "Toshimaen" shown in FIG. 6, "Toshimaen Fun" is not counted because this does not include a feature word regarding the POI name "Toshimaen," whereas "I went to Toshimaen. After all, amusement parks are nice" is counted because this includes a feature word "amusement park" regarding the POI name "Toshimaen."

The popularity derivation unit 13 counts the number of tweets that should be counted according to the co-occurrence word associations (4) to (1) as described above among the tweets linked to the popularity-assigned POI name, and derives the obtained count as the popularity for each popularity-assigned POI name. The derived popularity for each popularity-assigned POI name is output to the outside at a predetermined timing or on demand.

A series of processing in FIG. 2 is similarly executed for a synonym determined for a popularity-assigned POI name that is a target in advance. For example, when "TDL" is determined in advance as a synonym for "Tokyo Disneyland", "a+b" that is a sum of a popularity a derived for the popularity-assigned POI name "Tokyo Disneyland" and a popularity b derived for the synonym "TDL" is popularity of the popularity-assigned POI name "Tokyo Disneyland". Accordingly, a more accurate popularity that takes synonyms into account is obtained.

According to the embodiment of the invention described above, it is possible to derive the popularity of the POI with high accuracy while reducing manual intervention, whereas in the related art, it was necessary for a human to visually check posted data and individually determine whether or not the number of times a POI name appears in posted data should be counted.

Further, the following effects are achieved by executing various co-occurrence word associations. In the co-occurrence word association (2), when the predetermined condition such as "Condition that a station name in the same prefecture is included" is satisfied for the same POI name, the popularity derivation unit 13 counts the tweets as the number of tweets, thereby making it possible to reduce a likelihood of erroneously determining that the tweets are related to unintended POI names among the same POI names, and improve the accuracy of derivation of POI popularity.

Further, in the co-occurrence word association (3), the popularity derivation unit 13 counts tweets including unique POI names including prefecture names, such as Tokyo Disneyland and Osaka Castle, without referring to feature words, thereby reducing an amount of processing and improving processing speed.

Further, in the co-occurrence word association (4), the popularity derivation unit 13 counts tweets including feature words except for prefectures and municipalities among feature words, thereby making it possible to count only tweets used as POI names except for tweets estimated to be used in names other than the POI names, for names (for example, Kichijoji) that are commonly used in the POI name and a non-POI name (especially, a place name), and to improve accuracy of POI popularity derivation.

The popularity derivation unit 13 performs the co-occurrence word association (2) to (4) on the special cases as described above, and performs normal association of co-occurrence word association (1) on normal other cases, thereby realizing appropriate association can according to content of the case.

Two examples of further improvement to the embodiment of the invention described above will be described hereinafter.

Improvement Example 1

Improvement example 1 is an improvement example in handling of a POI name regarding a comprehensive facility that includes a plurality of POIs present at a plurality of places, and an example of such a comprehensive facility may include a "university" including a plurality of campuses present at a plurality of places. Therefore, an example of the handling of the POI names regarding the universities will be shown hereinafter.

For example, for the University of Tokyo, there are POI names indicating individual campuses such as "Hongo Campus of University of Tokyo" and "Komaba Campus of University of Tokyo," along with a representative POI name such as "National University of Tokyo." Because these include "University of Tokyo" in common, the same popularity is derived by linking with tweets and dealing with synonyms described above. That is, the same popularity is derived for the representative POI name and the POI names indicating individual campuses.

However, there is a need for weighting so that the popularity of the representative POI name is higher than the popularity of the POI names indicating the individual campuses.

Therefore, on the basis of the above need, the popularity derivation unit 13 may treat a plurality of POI names regarding the university as described above as synonyms, and weight the representative POI name and the POI names indicating individual campuses as follows. That is, in the popularity derivation unit 13, when the popularity derived by the above-described synonym association is set to n for the POI name "∘∘ University", in a case in which there are "XX University", "A campus of XX University", "B Campus of XX University", the POI name ending with "∘∘ University" is regarded as a representative POI name, and the popularity is set to n, and a proportional division, that is, popularity is set to "n/(m+1)" for (m) POI names indicating individual campuses. This makes it possible to perform adjustment so that the popularity of the representative POI name is higher than the popularity of the POI names indicating individual campuses.

In addition, when there is only one POI name "∘∘ University", the popularity of the POI name can be set to n, and when there is no POI name ending with "∘∘ University", the popularity of all POI names can be set to n because there is no representative POI name.

Improvement Example 2

Improvement example 2 is an improvement example in which tweets automatically generated by a check-in application (for example, Swarm (registered trademark)) are used to determine visited POIs, and that is used for derivation of popularity of POI names thereof.

When the user visits a certain store, the check-in application uses a check-in function based on a GPS (an automatic detection function for a visited store) of a user terminal to automatically post Tweets including a formal form such as "I'm at a store name in a place name". Therefore, the extraction unit 12 detects tweets regarding POI visit (store visit) posted by the check-in application using the above-described formal form as a key, and extracts the detected tweets as tweet data for popularity derivation.

In the tweets automatically generated by the check-in application, it is highly likely that inconsistency in a spelling of the POI name (store name) is very little, and a specific visited POI (visited store) is mentioned. Therefore, with improvement example 2 as described above, it is possible to consequently improve the accuracy of derivation of POI popularity.

Terminology, Variation Aspect, and the Like

The block diagram used in the description of the embodiment shows blocks on a per-function basis. These functional blocks (components) are realized by at least any one combination of hardware and software. Further, a method of realizing the respective functional blocks is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but the present disclosure is not limited thereto. For example, a functional block (component) that causes transmission to function is called a transmitting unit or transmitter. In either case, as described above, a realization method is not particularly limited.

Figure 7:
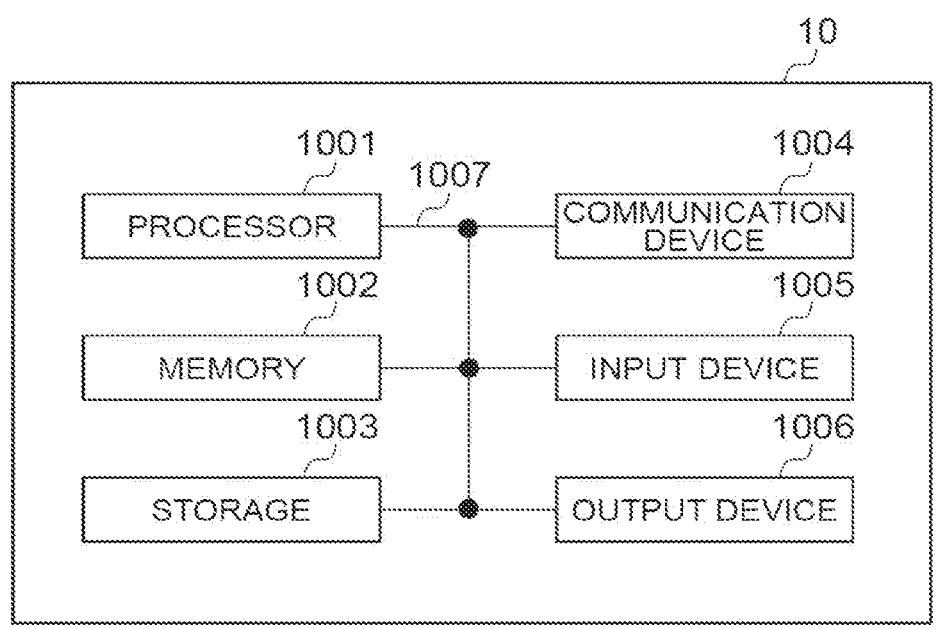
FIG. 7 is a diagram illustrating a hardware configuration example of a POI popularity derivation device.

For example, the POI popularity derivation device in an embodiment may function as a computer that performs the processing in the present embodiment. FIG. 7 is a diagram illustrating a hardware configuration example of the POI popularity derivation device 10. The POI popularity derivation device 10 described above may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. A hardware configuration of the POI popularity derivation device 10 may be configured to include one or a plurality of devices illustrated in the figures, or may be configured not to include some of the devices.

Each function of the POI popularity derivation device 10 is realized by loading predetermined software (a program) into hardware such as the processor 1001 or the memory 1002 so that the processor 1001 performs calculation to control communication that is performed by the communication device 1004 or control at least one of reading and writing of data in the memory 1002 and the storage 1003.

The processor 1001, for example, operates an operating system to control the entire computer. The processor 1001 may be configured of a central processing unit (CPU) including an interface with a peripheral device, a control device, a calculation device, a register, and the like.

Further, the processor 1001 reads a program (program code), a software module, or data from at least one of the storage 1003 and the communication device 1004 into the memory 1002 and executes various processes according to the program, the software module, or the data. As the program, a program for causing the computer to execute at least some of the operations described in the above embodiment may be used. Although the case in which the various processes described above are executed by one processor 1001 has been described, the processes may be executed simultaneously or sequentially by two or more processors 1001. The processor 1001 may be implemented by one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), a software module, or the like that can be executed to perform a wireless communication method according to an embodiment of the present disclosure.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database including at least one of the memory 1002 and the storage 1003, a server, or any other appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel). Further, each device such as the processor 1001 and the memory 1002 is connected by the bus 1007 for communicating information. The bus 1007 may be configured by using a single bus, or may be configured by using a different bus for each device.

Each aspect/embodiment described in the present disclosure may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Although the present disclosure has been described above in detail, it is obvious to those skilled in the art that the present disclosure is not limited to the embodiments described in the present disclosure. The present disclosure can be implemented as modified and changed aspects without departing from the spirit and scope of the present disclosure defined by the description of the claims Therefore, the description of the present disclosure is intended for exemplification, and does not have any restrictive meaning with respect to the present disclosure.

A process procedure, a sequence, a flowchart, and the like in each aspect/embodiment described in the present disclosure may be in a different order unless inconsistency arises. For example, for the method described in the present disclosure, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

The description "based on" used in the present disclosure does not mean "based only on" unless otherwise noted. In other words, the description "based on" means both of "based only on" and "at least based on".

When "include", "including" and variations thereof are used in the present disclosure, those terms are intended to be comprehensive like the term "comprising". Further, the term "or" used in the present disclosure is intended not to be an exclusive OR.

In the present disclosure, for example, when an article such as a, an, and the in English is added by translation, the present disclosure may include that a noun following such an article is plural.

In the present disclosure, a sentence "A and B differ" may mean that "A and B are different from each other." The sentence may mean that "each of A and B is different from C." Terms such as "separate", "coupled", and the like may also be interpreted, similarly to "different."

REFERENCE SIGNS LIST

10: POI popularity derivation device; 11: Dictionary generation unit; 11A: Popularity assignment POI dictionary; 12: Extraction unit; 13: Popularity derivation unit; 13A: Linking list; 1001: Processor; 1002: Memory; 1003: Storage; 1004: Communication device; 1005: Input device; 1006: Output device; 1007: Bus.

The invention claimed is:

1. A POI popularity derivation device comprising circuitry configured to:
    assign a feature word used as a co-occurrence word of a POI name to each popularity-assigned POI name serving as a popularity assignment target to generate a popularity-assigned POI dictionary in which a popularity-assigned POI name and a feature word are associated with each other;
    extract posted data serving as a search target from posted data on a basis of predetermined criteria; and
    search for the posted data extracted by the circuitry on a basis of a predetermined rule regarding feature words while referring to the popularity-assigned POI dictionary generated by the circuitry, to extract posted data linked to the popularity-assigned POI name, and derive the popularity of each popularity-assigned POI name on a basis of a number of pieces of extracted posted data for each popularity-assigned POI name.

2. The POI popularity derivation device according to claim 1,
    wherein the circuitry is configured to count the posted data as the number of pieces of posted data serving as a popularity derivation basis when predetermined conditions including one or more of a condition that the extracted posted data includes a station name in the same prefecture, a condition that the extracted posted data includes a municipality name with a POI in the same prefecture, and a condition that the extracted posted data includes a POI name of another POI in the same area are satisfied, for the same POI name in which there are the same popularity-assigned POI names for different POIs.

3. The POI popularity derivation device according to claim 1,
    wherein the circuitry is configured to count the posted data associated with the popularity-assigned POI name as the number of pieces of posted data serving as a popularity derivation basis without considering the feature word associated with the popularity-assigned POI name in the popularity-assigned POI dictionary, for unique POI names including a name of a prefecture in which there is a POI.

4. The POI popularity derivation device according to claim 1,
wherein the circuitry is configured to count posted data including feature words other than prefectures and municipalities among feature words associated with the popularity-assigned POI name in the popularity-assigned POI dictionary, for names commonly used between POI names and non-POI names.

5. The POI popularity derivation device according to claim 1,
wherein the circuitry is configured to further extract posted data linked to a synonym of the POI name regarding the same POI when there is such a synonym, and derive the popularity further on a basis of a number of pieces of posted data for the extracted synonym.

6. The POI popularity derivation device according to claim 1,
wherein the circuitry is configured to treat, as synonyms, a plurality of POI names regarding a predetermined comprehensive facility including a plurality of POIs present in a plurality of places, for the POI name regarding the facility, perform weighting based on a predetermined rule on a representative POI name and a POI name other than the representative POI name among the plurality of POI names, and count posted data linked to the popularity-assigned POI name.

7. The POI popularity derivation device according to claim 1,
wherein the circuitry is configured to detect posted data regarding a POI visit posted by a predetermined check-in application, and extract the detected posted data regarding the POI visit as posted data for popularity derivation.

8. The POI popularity derivation device according to claim 2,
wherein the circuitry is configured to count the posted data associated with the popularity-assigned POI name as the number of pieces of posted data serving as a popularity derivation basis without considering the feature word associated with the popularity-assigned POI name in the popularity-assigned POI dictionary, for unique POI names including a name of a prefecture in which there is a POI.

9. A POI popularity derivation device comprising circuitry configured to:
assign a feature word used as a co-occurrence word of a POI name to each popularity-assigned POI name serving as a popularity assignment target to generate a popularity-assigned POI dictionary in which a popularity-assigned POI name and a feature word are associated with each other;

extract posted data serving as a search target from posted data on a basis of predetermined criteria; and search for the posted data extracted by the extraction unit on a basis of a predetermined rule regarding feature words while referring to the popularity-assigned POI dictionary generated by the dictionary generation unit, to extract posted data linked to the popularity-assigned POI name, and derive the popularity of each popularity-assigned POI name on a basis of a number of pieces of extracted posted data for each popularity-assigned POI name, wherein the circuitry is configured to count posted data including feature words other than prefectures and municipalities among feature words associated with the popularity-assigned POI name in the popularity-assigned POI dictionary, for names commonly used between POI names and non-POI names.

10. A POI popularity derivation device comprising circuitry configured to:
assign a feature word used as a co-occurrence word of a POI name to each popularity-assigned POI name serving as a popularity assignment target to generate a popularity-assigned POI dictionary in which a popularity-assigned POI name and a feature word are associated with each other;

extract posted data serving as a search target from posted data on a basis of predetermined criteria; and search for the posted data extracted by the extraction unit on a basis of a predetermined rule regarding feature words while referring to the popularity-assigned POI dictionary generated by the dictionary generation unit, to extract posted data linked to the popularity-assigned POI name, and derive the popularity of each popularity-assigned POI name on a basis of a number of pieces of extracted posted data for each popularity-assigned POI name, wherein the circuitry is configured to further extract posted data linked to a synonym of the POI name regarding the same POI when there is such a synonym, and derive the popularity further on a basis of a number of pieces of posted data for the extracted synonym.

* * * * *